United States Patent
Srinivasan et al.

(10) Patent No.: US 10,158,564 B2
(45) Date of Patent: Dec. 18, 2018

(54) BORDER LEAF TRAFFIC CONVERGENCE IN A SOFTWARE DEFINED NETWORK

(71) Applicant: Cisco Technology, Inc., San Jose, CA (US)

(72) Inventors: Sathish Srinivasan, Fremont, CA (US); Vrishabha Sikand, Lexington, MA (US); Shyam N. Kapadia, San Jose, CA (US); Upendra N. Moholkar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 70 days.

(21) Appl. No.: 15/354,379

(22) Filed: Nov. 17, 2016

(65) Prior Publication Data

US 2018/0139127 A1    May 17, 2018

(51) Int. Cl.
*H04L 12/28* (2006.01)
*H04L 12/753* (2013.01)
*H04L 12/24* (2006.01)
*H04L 12/44* (2006.01)
*H04L 12/741* (2013.01)

(52) U.S. Cl.
CPC .............. *H04L 45/48* (2013.01); *H04L 12/44* (2013.01); *H04L 41/12* (2013.01); *H04L 45/745* (2013.01)

(58) Field of Classification Search
CPC combination set(s) only.
See application file for complete search history.

(56) References Cited

U.S. PATENT DOCUMENTS

| 6,097,718 A * | 8/2000 | Bion .................. H04L 45/02 370/351 |
| 9,485,115 B2 | 11/2016 | Kapadia et al. |
| 2006/0039385 A1* | 2/2006 | Bare .................. H04L 12/18 370/400 |
| 2010/0085982 A1* | 4/2010 | Martinotti ............ H04L 12/462 370/420 |

(Continued)

OTHER PUBLICATIONS

"Cisco Data Center Spine-and-Leaf Architecture: Design Overview", White Paper, 27 pages.

(Continued)

*Primary Examiner* — Maharishi V Khirodhar
(74) *Attorney, Agent, or Firm* — Edell, Shapiro & Finnan, LLC (57) ABSTRACT

A border leaf of a software defined computer network receives network traffic directed to a first endpoint from a second endpoint. The first endpoint is connected to the software defined network, and the second endpoint is external to the software defined network. If the border leaf determines that it does not have a stored network route for an active conversation between the first endpoint and the second endpoint, the border leaf determines a valid network route for the network traffic to reach the first endpoint. The border leaf stores the valid network route and forwards the network traffic to the first endpoint. The border leaf transmits a synchronization message to other border leaf nodes of the computer network. The synchronization message causes the other border leaf(s) to store the valid network route and an indication that the original border leaf is forwarding the network traffic in the active conversation.

20 Claims, 6 Drawing Sheets

(56) References Cited

U.S. PATENT DOCUMENTS

| | | | |
|---|---|---|---|
| 2013/0195105 A1* | 8/2013 | Basso | H04L 45/02 370/389 |
| 2013/0215888 A1* | 8/2013 | Zhang | H04L 45/02 370/390 |
| 2014/0140244 A1* | 5/2014 | Kapadia | H04L 61/103 370/255 |
| 2014/0254589 A1 | 9/2014 | Kapadia et al. | |
| 2015/0256445 A1* | 9/2015 | Pai | H04L 45/66 709/238 |
| 2015/0312134 A1* | 10/2015 | Kapadia | H04L 45/02 370/256 |

OTHER PUBLICATIONS

"Configuring FabricPath Switching", Chapter 2, Cisco Nexus 7000 Series NX-OS FabricPath Configuration Guide, OL-22842-01, 22 pages.

* cited by examiner

BORDER LEAF TRAFFIC CONVERGENCE IN A SOFTWARE DEFINED NETWORK

TECHNICAL FIELD

The present disclosure relates to forwarding network traffic at border gateway nodes in a software defined network.

BACKGROUND

Software defined networking presents a standards based control and data plane solution for building the next generation data centers. For example, the Application Centric Infrastructures provided by Cisco® is a software defined networking solution designed to automate, configure, and manage data center fabrics, and have become popular in enterprise data center environments. Cisco is a registered trademark of Cisco Technology, Inc. The Programmable Fabric provided by Cisco® is a software defined network solution that leverages the standards-based Multi-Protocol Border Gateway Protocol (MP-BGP) Ethernet Virtual Private Networking (EVPN) as the underlying control plane to optimize traffic flow and scale-out virtual extensible LAN (VXLAN) fabrics. That is, the Programmable Fabric employs VXLAN for the data plane and MP-BGPEVPN for the control plane. The EVPN address family carries both Media Access Control (MAC) and Internet Protocol (IP) addresses of the tenant hosts, thereby ensuring that forwarding is dictated by the information fed by the control plane, enhancing scalability. These abilities address the disadvantages of flood-and-learn based data plane solutions.

DESCRIPTION OF EXAMPLE EMBODIMENTS

Overview

Presented herein are techniques for synchronizing network routes among network gateway elements. A first network gateway element of a first computer network receives network traffic directed to a first endpoint device from a second endpoint device. The first endpoint device is connected to the first computer network, and the second endpoint device is external to the first computer network. In response to a determination that the first network gateway element does not have a stored network route for an active conversation between the first endpoint device and the second endpoint device, the first network gateway element determines a valid network route on the first computer network for the network traffic to reach the first endpoint device. The first network gateway element stores the valid network route and forwards the network traffic to the first endpoint device according to the valid network route. The first network gateway element transmits a synchronization message to one or more second network gateway elements of the first computer network. The synchronization message causes the second network gateway element(s) to store the valid network route and an indication that the first network gateway element is forwarding the network traffic in the active conversation between the first endpoint device and the second endpoint device.

Detailed Description

One feature offered by certain software defined networking solutions, such as the Programmable Fabric, is the realization of a distributed Internet Protocol (IP) anycast gateway at the leaf or access layer, thereby ensuring both layer 2 and layer 3 traffic is optimally forwarded within the fabric. In these solutions, the fabric architecture is based on a leaf-spine Clos topology with a scale-out property in which tenant scale can be increased by adding more leaf nodes. There are designated nodes, referred to as border leaf nodes or more simply border leafs, that connect the fabric to external networks. Spine nodes with border functionality may also be employed. Hereinafter, the term border leaf node is used to describe any border gateway element, including spine nodes with border functionality.

All North-South traffic (i.e., traffic between elements inside a data center and elements outside that data center) goes through one of the border leaf nodes. North-South traffic includes traffic going from inside the data center to either a wide area network (WAN), such as the global Internet, or to other data center sites via a Data Center Interconnect (DCI) link. External traffic from tenant endpoints attached to the leaf nodes is sent to a border leaf node that typically attracts that traffic via injection of a default route within the fabric (e.g., advertised via BGP). Reverse traffic that is sent back to the tenant endpoints from outside the data center goes to a border leaf node that, in turn, has to route the traffic to the appropriate leaf node where the tenant endpoint is connected. With distributed subnets, the border leaf node needs to store the host routes (e.g., /32 or /128) of all tenant workloads to ensure optimal one-hop forwarding even for the reverse traffic. As the scale of the tenants and tenant endpoints goes up, the hardware Forwarding Information Base (FIB) resources on the border leaf nodes are increasingly taxed.

One technique for conserving FIB resources is conversational learning where only host routes associated with active North-South traffic is pushed to the FIB hardware with appropriate aging out to ensure that entries are periodically flushed to remove host routes for inactive conversations. Typically, with layer-3 conversational learning, the reverse traffic coming from external networks into the data center will hit a glean entry, which in turn will result in a notification to the routing software. Based on this notification, the routing software process will install the host route, corresponding to the tenant endpoint within the fabric, in the hardware (e.g., a content addressable memory (CAM)), ensuring that any further traffic will be forwarded at the hardware level. This describes the expected startup latency associated with any layer-3 conversational learning scheme.

Typical convergence for an active conversation on failure of a border leaf node carrying the active conversation involves the ingress leaf discovering that the border leaf node is down and modifying its hardware tables to point to an alternate border leaf. This is typically a function of how fast the underlay Interior Gateway Protocol (IGP) detects the failure of the border leaf node. In the presence of layer-3 conversational learning at the border leaf node, there is an additional delay of installing the remote host entry in the hardware FIB table at the alternate border leaf node.

Layer 3 conversational learning is an effective single-box solution, but, as noted, may result in additional startup latency for active traffic flows in case of failures (e.g., border leaf failure, interface failure between the edge router and the border leaf, etc.) or topology changes (e.g., adding a new network element to change which border leaf handles a conversation). In other words, the first time a border leaf node encounters an active conversation, an initial delay is required to determine the host route and push the host route into the hardware FIB resources. If there are multiple border leaf nodes (e.g., for redundancy or load sharing), each border leaf node will incur the initial delay in setting up the conversation. The techniques presented herein ensure that once an active conversation is detected (which will incur the initial delay to set up the conversation), there is no additional latency delay in that conversation irrespective of which border leaf node receives the traffic in the conversation.

In high scale environments with multi-tenant traffic coming in and going out of the data center, optimizing IP forwarding on the border leaf nodes without delays and/or losses is imperative. In one example of a low latency application, every millisecond of delay in a high frequency trading application can have a significant dollar impact for the customers of the data center provider. The techniques presented herein allow for a dramatic decrease in the convergence time for the resumption of all flows after a border leaf node failure. In one example, with 20,000 traffic flows that were handled by a failed border leaf node, the convergence time for a backup border leaf to resume all 20,000 conversations drops from 15 minutes to under 2 seconds. With a large number of flows, conversation learning, which relies on data traffic being sent to software, causes a longer delay when all of the flows move at the same time (e.g., border leaf failure, node addition or removal, external link failure, change in network topology, etc.). A combination of control plane policing and network churn at the time of the event may cause extended delays in the presence of layer 3 conversational learning. While a large number of traffic flows leads to large delays, the effect is noticeable with a smaller number of flows as well. Synchronizing the host routes in the hardware, as described herein, maintains the benefits of layer 3 conversational learning while mitigating any convergence side effects.

The techniques presented herein describe a scheme for ensuring that layer-3 conversational learning at border leaf nodes does not incur any additional penalty, even in the presence of failures, when there multiple border leaf nodes are deployed in a data center. In order to optimally forward traffic on the border leaf nodes without any delays, any active conversations being learned through conversational learning on one border leaf node is synchronized across the other border leaf nodes. In this way, any traffic sent for that conversation through any border leaf node is hardware forwarded (e.g., through a FIB/forwarding table) with minimal delays in convergence.

Once layer 3 conversational learning is enabled on a border leaf node, it does not necessarily install an entry (e.g., a network route) in the hardware forwarding table until an active conversation is detected. That process may be driven by data hitting the subnet route on the border leaf that in turn drives the glean adjacency. This acts as a trigger to the software/control plane to install the corresponding destination route (i.e., host route) in the hardware forwarding table. Note that the host routes distributed by the control plane are present at all border leaf nodes in which that tenant is instantiated. Consequently, hardware scaling on the border leaf node is significantly improved as border leaf nodes typically have many more tenants configured than internal leaf nodes do.

The initial setup of the hardware forwarding table causes a slower start to the conversation when compared to the case in which the hardware entry was pre-installed. If a border leaf node fails, an active conversation may be interrupted for a longer time than it would have been without the layer 3 conversational learning feature. The techniques described herein synchronize records of an active conversation that is ongoing among those border leaf nodes that already host a particular tenant. Border leaf nodes do not synchronize extra host routes, but add an extra state for the same route that would already be present for border leaf nodes of that particular tenant. This causes other border leaf nodes that already have these routes in software to install these specific routes in active conversations into the hardware forwarding table.

Notably, the techniques described herein do not necessarily distribute host routes to backup routers, but rather a state is distributed about whether the host route is installed in the hardware forwarding table. This state information is relevant and consumed only by those routers that already have this route in their control plane. Accordingly, the existing routing control planes are not altered. By synchronizing the hardware forwarding table state, convergence properties of the border leaf nodes improve.

Figure 1:
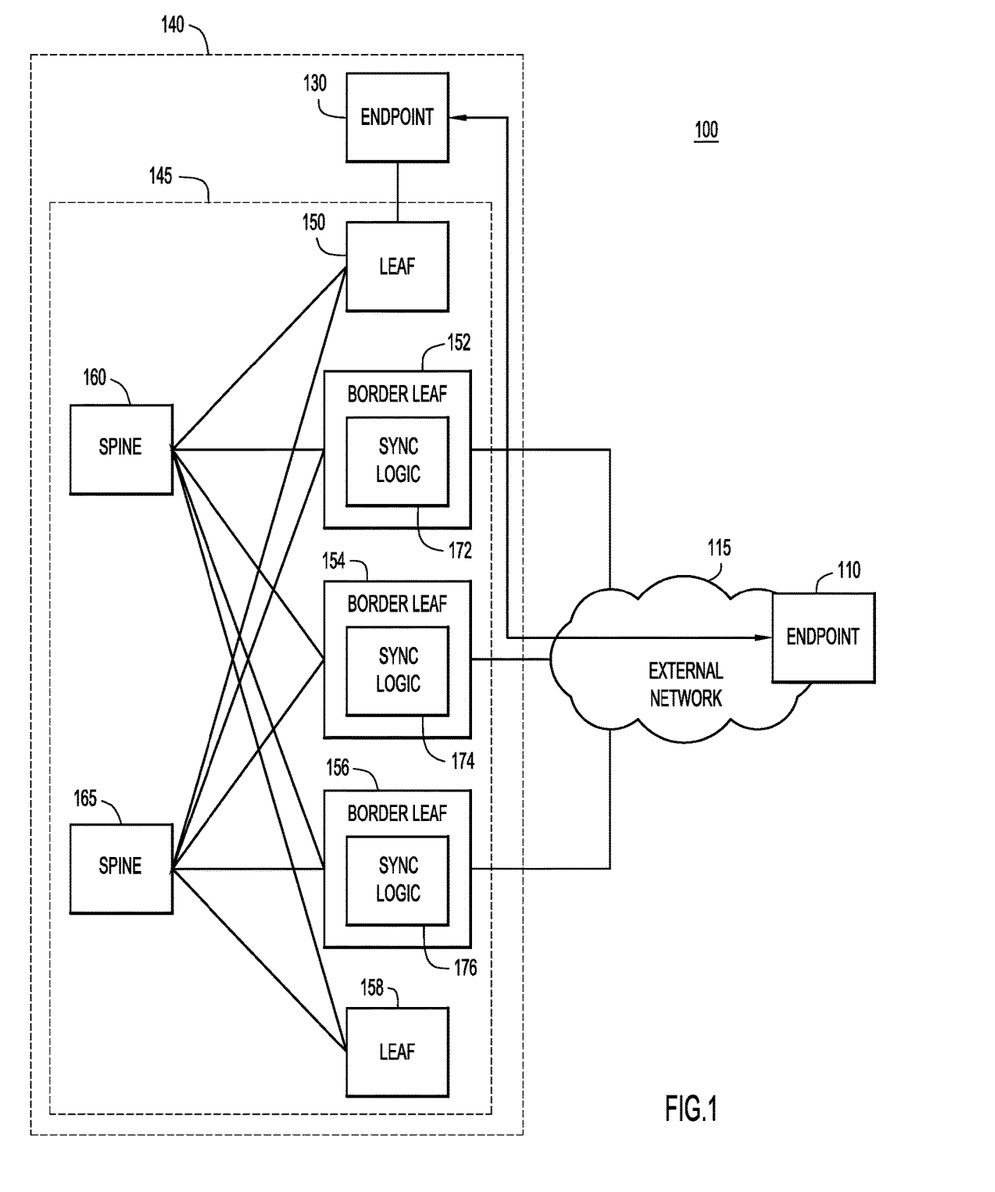
FIG. 1 is a block diagram of a network environment configured to implement host route storing and updating techniques at border leaf nodes, according to an example embodiment.

Referring now to FIG. 1, a conversational learning system 100 system that synchronizes host routes in border leaf nodes is shown. An endpoint 110 connected to an external network 115 participates in a conversation 120 with an endpoint 130 in a data center 140. The conversation 120 may be bidirectional or unidirectional. As shown, the data center 140 includes a computer network 145 comprising leaf nodes 150, 152, 154, 156 and 158 and spine nodes 160 and 165. The computer network 145 is, in this example, a Clos topology such that the leaf nodes are fully meshed to the spine nodes, i.e., each leaf node 150, 152, 154, 156 and 158 is connected to both of the spine nodes 160 and 165. Leaf nodes 152, 154, and 156 are border leaf nodes that connect the computer network 145 of the data center 140 to the external network 115. Border leaf nodes 152, 154, and 156 each include synchronization logic 172, 174, and 176, respectively, configured to synchronize host routes between the border leaf nodes 152, 154, and 156.

The endpoints 110 and/or 130 may be physical computing devices or virtual machines configured on physical devices not explicitly shown in FIG. 1. Similarly, the network elements of computer network 145 (e.g., leaf nodes 150, 152, 154, 156, 158 and/or spine nodes 160, 165) may be physical network elements or virtual network elements instantiated on physical computing devices. Additionally, it is to be appreciated more or fewer leaf nodes and spine nodes may implemented in the computer network to ensure a scalable architecture and that the computer network 145 may be configured with a different topology (e.g., fully meshed, star, ring, etc.). As such, it is to be appreciated that the arrangement shown in FIG. 1 is merely an example and that the techniques presented herein may be implemented in alternative arrangements. In general, the techniques presented herein may be implemented with any computer network that includes external facing network gateway elements (e.g., border leaf nodes 152, 154, and 156) and internal network elements (e.g., leaf nodes 150 and 156 and spine nodes 160 and 165).

In one example, the conversation 120 begins with endpoint 110 sending network traffic over the external network 115 to the data center 140. The network traffic is received at the border leaf 152 with a destination address for endpoint 130. The border leaf 152 looks up the destination address in a forwarding table (e.g., FIB table) and, since this is the first network traffic in the conversation 120, there is no network route stored for the destination address. The border leaf 152 learns the network route (e.g., endpoint 130 is connected to the computer network 145 through leaf node 150) and stores the network route for the destination address in the hardware FIB table. In another example, the border leaf 152 has previously learned the network route prior to receiving any network traffic for the route (e.g., when the endpoint 130 connects to the network 145). The border leaf 152 stores the network route in software (e.g., in a Routing Information Base (RIB)) until it receives network traffic directed toward the destination endpoint 130, at which point the border leaf 152 installs the network route in the hardware FIB table. Any subsequent traffic in the conversation 120 can be quickly forwarded to the leaf node 150, since the border leaf node 152 has stored the network route to reach the endpoint 130.

In a further example, the data center 140 may include multiple tenants (not shown), each of which requires a separate computer network 145. The networks for different tenants may be separated physically (e.g., different physical network elements) or virtually (e.g., Virtual Routing and Forwarding (VRF)). The synchronization logic on the border leaf nodes will synchronize the network routes among border leaf nodes of the same tenant's computer network. In other words, the data center 140 may include dozens (or hundreds) of leaf nodes, with each tenant in the data center using a few of the leaf nodes for its computer network. Only the border leaf nodes within a single tenant's computer network will be updated with network routes learned from an active conversation. Any border leaf node from a different tenant will ignore a message to install a network route from a conversation involving a destination address of a different tenant.

Figure 2:
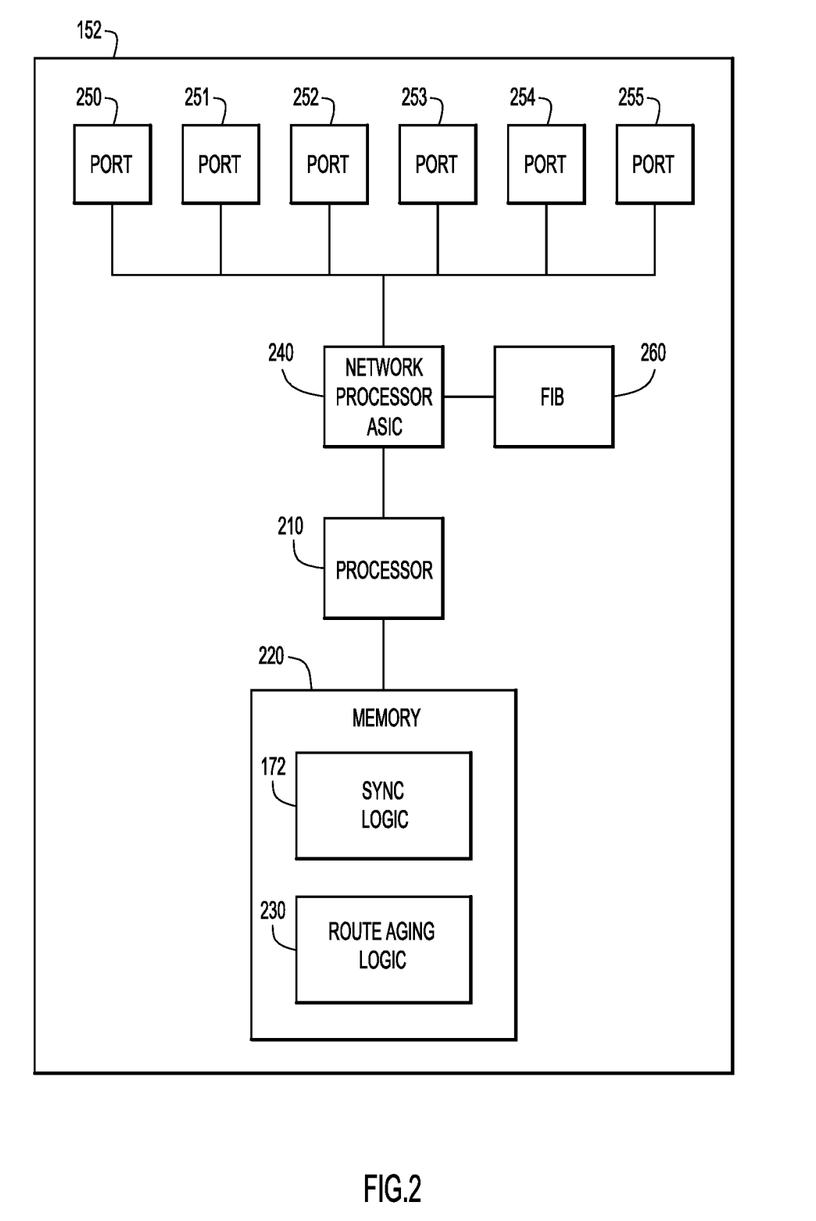
FIG. 2 is a simplified block diagram of a border leaf node, according to an example embodiment.

Referring now to FIG. 2, a simplified block diagram is shown of the border leaf node 152 configured to perform the techniques of a network gateway element. Border leaf node 152 includes, among other possible components, a processor 210 to process instructions relevant to processing software related to network routing, and memory 220 to store a variety of data and software instructions (e.g., Synchronization logic 172, route aging logic 230, etc.). The border leaf node 152 also includes a network processor application specific integrated circuit (ASIC) 240 to process communication packets that flow through the border leaf node 152. Network processor ASIC 240 processes communication packets be sent to and received from ports 250, 251, 252, 253, 254, and 255. While only six ports are shown in this example, any number of ports may be included in border leaf node 152. Network processor ASIC 240 may use a Forwarding Information Base (FIB) 260 to store network routes associated with specific destination addresses without requiring any software lookup, e.g., through processor 210. The FIB 260 may include a content addressable memory (CAM) to store the network routes in association with the destination addresses of endpoints.

Memory 220 may include read only memory (ROM), random access memory (RAM), magnetic disk storage media devices, optical storage media devices, flash memory devices, electrical, optical, or other physical/tangible (e.g., non-transitory) memory storage devices. The processor 210 is, for example, a microprocessor or microcontroller that executes instructions for implementing the processes described herein. Thus, in general, the memory 220 may comprise one or more tangible (non-transitory) computer readable storage media (e.g., a memory device) encoded with software comprising computer executable instructions and when the software is executed (e.g., by the processor 210) it is operable to perform the operations described herein.

Figure 3:
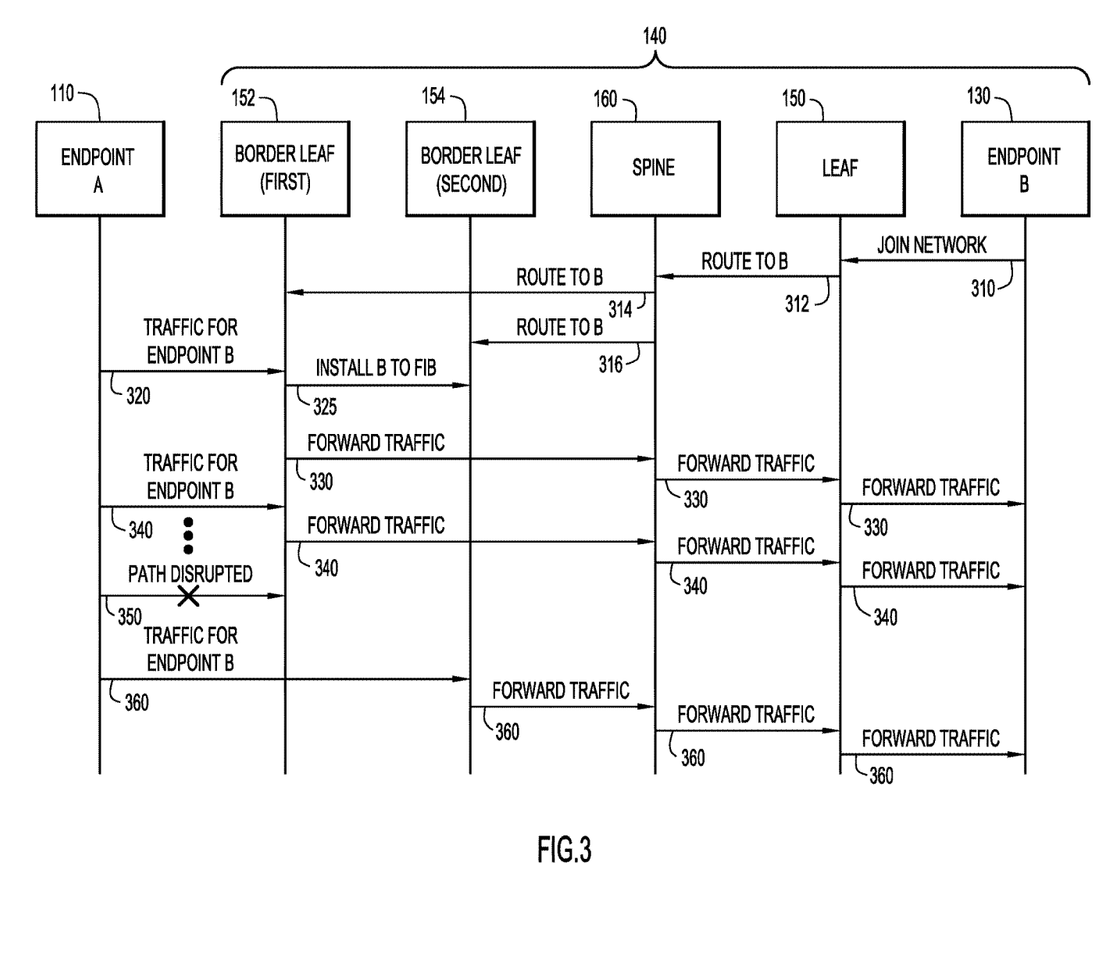
FIG. 3 is a ladder diagram illustrating a sequence of messages exchanged in implementing the host route storing and updating techniques at border leaf nodes, according to an example embodiment.

Referring now to FIG. 3, shown is a ladder diagram illustrating a sequence of messages passed between computing devices to synchronize the state of the host routes in the border leaf nodes of a computer network. For ease of illustration, the example of FIG. 3 is described with reference to the environment described above with reference to FIG. 1.

Initially, an endpoint B (e.g., endpoint 130) sends a message 310 to connect to the leaf node 150 and join the network 145. The leaf node 150 determines a network route for traffic to reach endpoint B and notifies the other leaf nodes in the network that the endpoint B has joined the network. In one example, a leaf supervisor, which may be logic within the leaf node 150, determines the network route and sends the network route for endpoint B to a Route Reflector (e.g., spine node 160) in message 312. The Route Reflector spine node 160 forwards the network route for endpoint B to the first border leaf node 152 and the second border leaf node 154 in messages 314 and 316, respectively. The border leaf nodes 152 and 154 store the network route to the endpoint B in software (e.g., in a Routing Information Base (RIB)), but do not automatically install the network route in the hardware FIB table. In general, the RIB including the network route to endpoint B is reflected to any leaf node that has the same tenant as endpoint B installed.

An endpoint A (e.g., endpoint 110) that is outside of the data center 140 sends a message 320 directed toward endpoint B, which is located inside the data center 140. The message 320 is received at a first border leaf node 152, which searches a forwarding table (e.g., FIB 260, shown in FIG. 2) for an entry corresponding to the host route for endpoint B. When the first border leaf node 152 does not find a host route stored for endpoint B in the forwarding table, the first border leaf node 152 installs the network route for endpoint B that was stored in software (e.g., in its RIB) into its hardware forwarding table (e.g., in its FIB).

After installing the network route in the hardware forwarding table, the first border leaf node 152 sends a message 325 to inform the second border leaf node 154 of the active conversation, which causes the second border leaf node 154 to install the network route to endpoint B from the RIB to its hardware forwarding table. In one example, a border leaf supervisor on the first border leaf node 152 handles the control plane that dictates which network routes are installed in the hardware forwarding table of each border leaf node, and is responsible for sending the message 325 to the second border leaf node 154. Additionally, the message 325 indicates that the host route is initially being handled by the first border leaf node 152. In one example, the message 325 may be distributed between the border leaf nodes via a Border Gateway Protocol (BGP) process, and includes an indication that the host route is to be synchronized across the border leaf nodes.

The border leaf node 152 forwards the traffic 330 to the endpoint B along spine 160 and leaf node 150. Any subsequent traffic 340 in the active conversation from endpoint A to endpoint B that is received at the first border leaf node 152 is forwarded according to the stored host route, and switched quickly to the endpoint B via the spine 160 and leaf 150.

If the path between the endpoint A and the first border leaf node 152 is disrupted (e.g., the first border leaf node 152 fails or the external network connection to the first border leaf node 152 fails), then the traffic 350 in the active conversation does not reach the first border leaf node 152. In such examples, the external network will find the second border leaf node 154 as a connection between the data center 140 and the external network and send subsequent traffic 360 to the second border leaf node 154. Since the second border leaf node 154 has already stored a host route for the active conversation including message 360, the second border leaf node 154 can begin forwarding the message 360 to the endpoint B via the spine 160 and the leaf 150. That is, the second border leaf node 154 has already stored the host route (e.g., in a forwarding table) and does not require spending any time consulting the RIB to determine the host route, which would insert a delay into the active conversation from endpoint A to endpoint B. Therefore, by synchronizing the host routes for active conversations across all of the border leaf nodes, the system minimizes delays in continuing the active conversations when a new border leaf handles the traffic in the active conversation.

In one example, the border leaf nodes 152 and 154 are made Route Reflectors, along with the spine nodes (e.g., spine 160) in the network fabric for the data center 140. With conversational learning enabled on all the border leaf nodes, the host routes will be installed in the FIB tables of the border leaf nodes only when they are involved in an active conversation. When an active conversation is learned on a border leaf node, an extended cost community with a special cost community values (e.g., SYNC_ACT_CONV(COST: pre-bestpath:112:4294967294)) is attached/updated to the host BGP route learned on the initial border leaf node. This will result in a BGP update, which is then reflected to the other border leaf nodes. The community is marked as non-transitive, meaning that it does not leave the current data center 140.

When the other border leaf nodes receive the updated host BGP route with the special extended cost community, each border leaf node stores an indication associating the host route with the active conversation handled by the initial border leaf node. The other border leaf nodes also install the host route in their hardware FIB tables. Additionally, the other border leaf nodes do not attempt to age out the synchronized host routes, even though they may not be actively receiving traffic that uses those host routes. In this way, traffic from any external entity routed/hashed through any of the border leaf nodes to the endpoint in the active conversation will be hardware forwarded without any delays in FIB convergence. Other leaf nodes in the network fabric may receive the host route BGP update (including the special extended cost community), but it will be ignored on the other leaf nodes.

Through the above operations, the host routes for active conversations are synchronized across all of the border leaf nodes. In other examples, the host routes for active conversations are only synchronized across the border leaf nodes that have a tenant virtual routing and forwarding (VRF) locally instantiated. Typically tenant VRFs may be instantiated on two or more border leaf nodes for redundancy purposes. Any other border leaf nodes that do not have that particular tenant VRF instantiated will ignore the BGP update with the cost community just as they would for other BGP route updates for a non-local tenant.

In another example, border leaf nodes may be peered with one another to synchronize host routes in active conversations. The peering mechanism may be done by existing routing protocols (e.g., BGP, Open Shortest Path First (OSPF), Intermediate System to Intermediate System (IS-IS), or Enhanced Interior Gateway Routing Protocol (EIGRP)), or it may be achieved by a proprietary protocol designed for synchronizing information reliably across nodes. For instance, if the peering is done through BGP, then the procedure described above may be followed to synchronize active conversations across all of the border leaf nodes. If the peering is done through IGPs, then the respective IGP exchange mechanisms may be used to synchronize the active conversations to all of the border leaf nodes. This example involves configuration changes in order to establish a peering relationship between border leaf nodes and also exchange information regarding active conversations.

Figure 4:
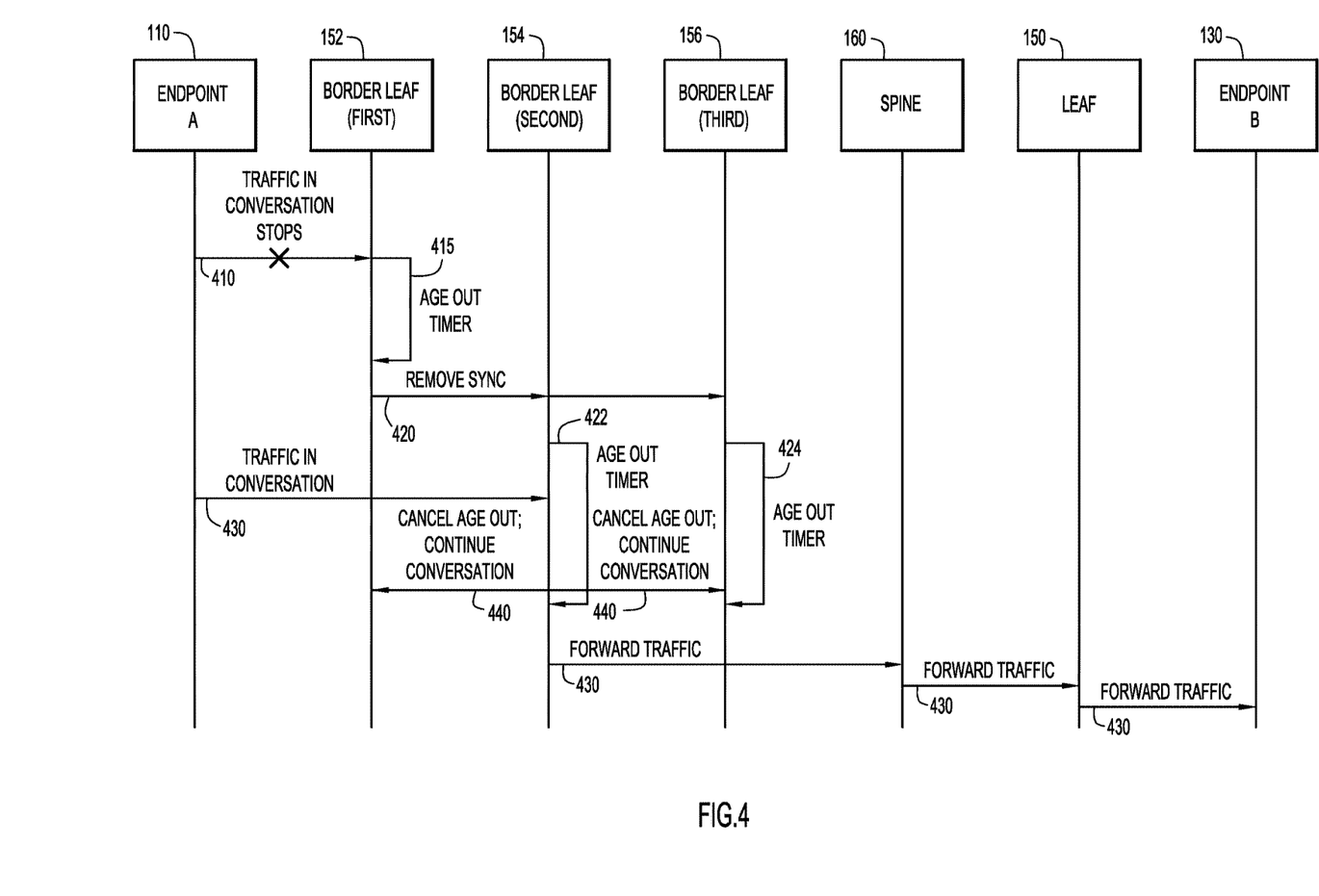
FIG. 4 is a ladder diagram illustrating a sequence of messages exchanged in aging out host routes from inactive conversations, according to an example embodiment.

Referring now to FIG. 4, shown is a ladder diagram illustrating a sequence of messages passed between computing devices to age out host routes for inactive conversations in three border leaf nodes of a computer network. For ease of illustration, the example of FIG. 3 is described with reference to the environment described above with reference to FIG. 1.

In addition to the first border leaf node 152 that initially handled the network traffic 410 in a conversation between endpoint A (e.g., endpoint 110) and endpoint B (e.g., endpoint 130), the second border leaf node 154 and the third border leaf node 156 have stored the host route in respective forwarding tables as part of the synchronization system. After the first border leaf node 152 stops receiving traffic 410 from an active conversation, the first border leaf node 152 starts an age out timer 415. If the age out timer 415 expires, then the first border leaf node 152 sends a message 420 to remove the synchronization at any other border leaf nodes, such as the second border leaf node 154 and the third border leaf node 156.

When the second border leaf node 154 receives the message 420 indicating that the first border leaf node 152 has removed the synchronization status of a host route, the second border leaf node 154 starts its age out timer 422 and the third border leaf node 156 starts its age out timer 424. The second border leaf node 154 receives additional traffic 430 in the active conversation before the age out timer 422 expires, which cancels the age out timer 422. Additionally, the second border leaf node 154 sends a message 440 to all of the other border leaf nodes (e.g., first border leaf node 152 and third border leaf node 156) indicating that the second border leaf node 154 will continue the active conversation. In response to receiving the message 440, the other border leaf nodes cancel any age out timers currently running, and maintain the synchronization of the host route by continuing to store the host route in the hardware forwarding table. The second border lead node 154 forwards the additional traffic 430 to the endpoint B along the host route (e.g., via spine 160 and leaf 150). In this way, all three border leaf nodes are synchronized to store the host route for the active conversation between endpoint A and endpoint B with an indication that the second border leaf node 154 is currently handling the traffic in the conversation. In other words, the primary responsibility for aging out the host route has shifted from the first border leaf node 152 to the second border leaf node 154 after the traffic was routed to the second border leaf node 154.

In one example, when an active conversation ages out on the original border leaf node 152, the border leaf node 152 removes the previously update extended cost community (COST:pre-bestpath:112: 4294967294), which is then reflected to the other border leaf nodes 154 and 156. In other words, aging a host route for an active conversation is triggered only by the original border leaf node 152 (i.e., the border leaf node that added the special extended cost community). The other border leaf nodes 154 and 156, to which the host route entry was synchronized, do not age out any synchronized entries.

After the other border leaf nodes 154 and 156 have received the update removing the synchronization from the original border leaf node 152, the other border leaf nodes 154 and 156 each start an age out timer locally. If the age out timer expires, then the host route for the inactive conversation is removed on all of the border leaf nodes with the appropriate deletion from their respective hardware FIB tables. If the entry is still active on any of the border leaf nodes due to receiving traffic in the active conversation, that border leaf node will in turn become the "original" border leaf node and send out a BGP update with the extended cost community. In this way, the procedure for synchronizing the host routes across all of the border lead nodes is repeated with the new "original" border leaf node.

In other words, the "original" border leaf node may be considered a master node over a particular network route associated with an active conversation, and the master border leaf node instructs the other border leaf nodes (i.e., slave border leaf nodes) to refrain from aging out the network route while the master border leaf node is handling the traffic in the active conversation. Once the master border leaf node has aged out a network route, or if the master border leaf node goes down, then master border leaf node relinquishes its master role for the network route. At that point, any of the former slave border leaf nodes may assume the master role if it receives additional traffic in the conversation.

In another example, with a distributed system there may be multiple original border leaf nodes for the same host entry prefix advertised via BGP with the special extended cost community. In this case, the other border leaf nodes will only start their age out timer once all of the original border leaf nodes have withdrawn their previously advertised conversational interest via BGP.

In a further example, the same aging related actions shown in FIG. 4 may be performed when the first border leaf node 152, i.e., the original border leaf node, fails. In the event that the original border leaf node 152 fails, the age out timers on each of the other border leaf nodes start when the other border leaf nodes detect that the original border leaf node 152 has failed. For instance, an interior gateway protocol (IGP) update of the unreachability of the first border leaf node 152 may trigger the other border leaf nodes to start their age out timers on host routes originally synchronized by the first border leaf node 152.

Figure 5:
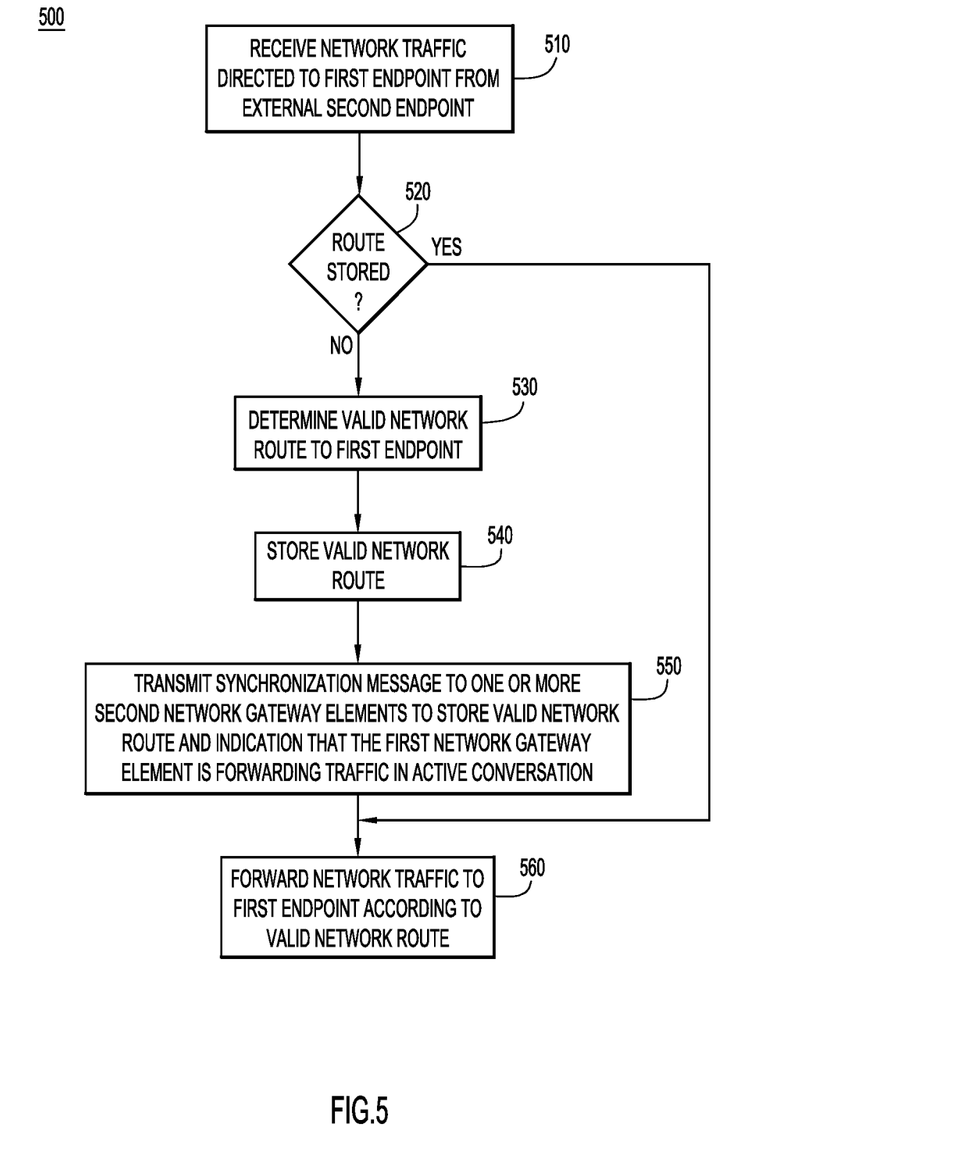
FIG. 5 is a flowchart of operations performed by a border leaf node to synchronize host routes for active conversations, according to an example embodiment.

Referring now to FIG. 5, a flowchart illustrates an example process 500 by which a network gateway element (e.g., a border leaf node) signals other network gateway elements to synchronize network routes used in active conversations. In step 510, a first gateway network element receives network traffic directed to a first endpoint from a second endpoint. The first gateway network element is part of a first computer network that connects to the first endpoint. The second endpoint is external to the first computer network (i.e., it is not directly connected to the first computer network). In other words, network traffic to/from the second endpoint must pass through network elements that are not a part of the first computer network. After receiving the network traffic directed to the first endpoint, the first gateway network element determines, in step 520, whether the first gateway network element has a stored network route on the first computer network for network traffic in the active conversation between the first endpoint device and the second endpoint device.

If the first network gateway element does not have a stored network route to the first endpoint, then the first network gateway determines a valid network route along the first computer network to the first endpoint in step 530. In one example, the network route may be determined by a supervisory process that finds a network route to the first endpoint. In step 540, the first network gateway element stores the valid network route to the first endpoint. In one example, the first network gateway element may reflect the valid network route to one or more second network gateway elements in the first computer network. Additionally, the first network gateway element transmits a synchronization message to the one or more second network gateway elements in step 550. The synchronization message causes the second network gateway elements to store the valid network route along with an indication that the first network gateway element is forwarding traffic to the first endpoint in an active conversation. The synchronization message also causes the second network gateway element(s) to refrain from aging out the valid network route even if the second network gateway element(s) do not receive any traffic in the active conversation (e.g., when the first network gateway element is handling all of the network traffic).

After the first network gateway element has stored a valid network route to the first endpoint, either previously stored as determined in step 520 or newly stored in step 540, the first network gateway element forwards the network traffic to the first endpoint according to the valid network route in step 560. In one example, one or more of the second network gateway elements may also forward any network traffic that they receive in the active conversation.

Figure 6:
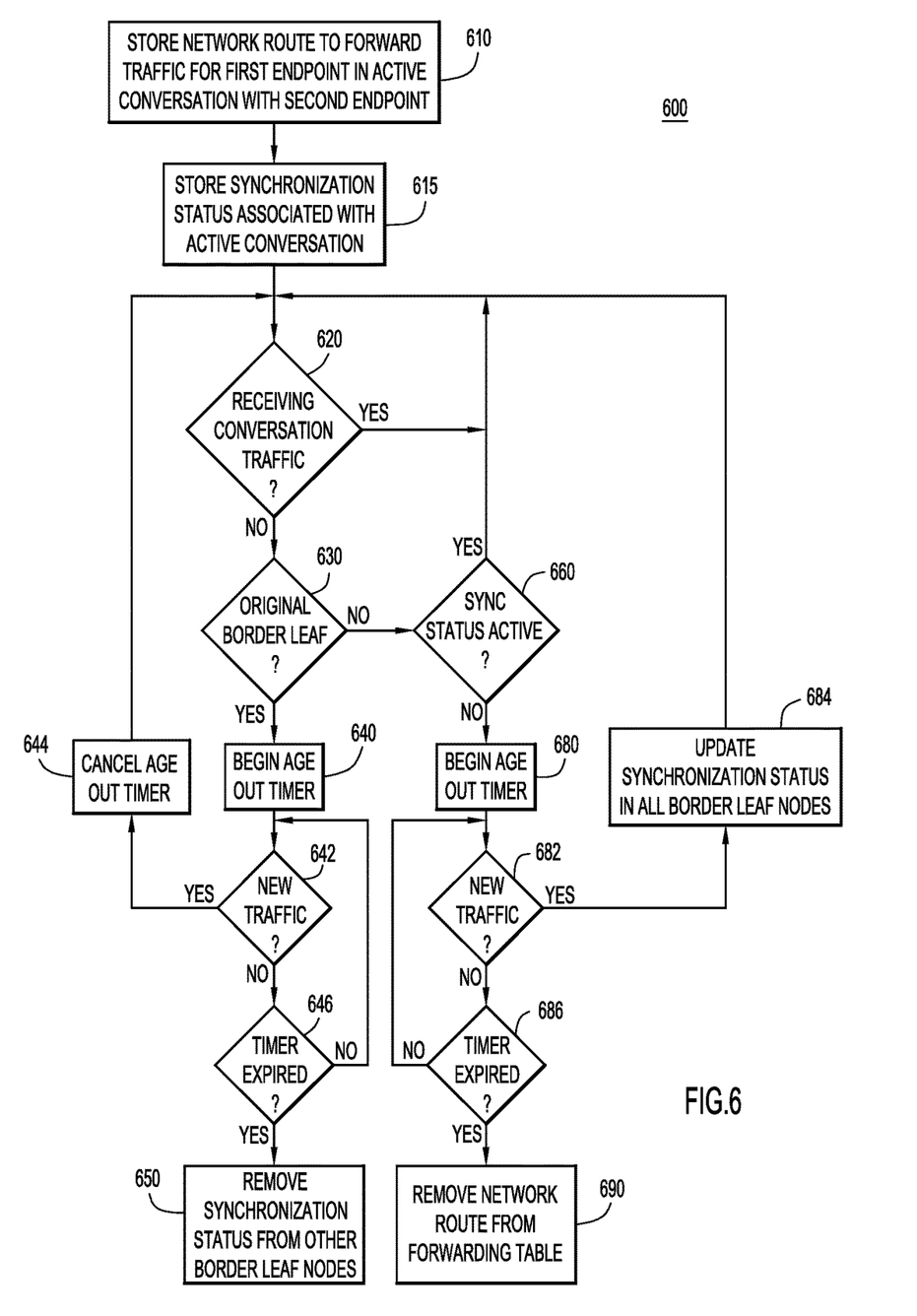
FIG. 6 is a flowchart of operations performed by a border leaf node to age out host routes for inactive conversations, according to an example embodiment.

Referring now to FIG. 6, a flowchart illustrates an example process 600 by which a border leaf node (i.e., a network gateway element) ages out network routes and signals other border leaf nodes to remove the synchronization of the network routes and begin to age out the network routes. In step 610, a border leaf node stores a network route that is used to forward traffic directed to a first endpoint in an active conversation with a second endpoint. In one example, the border leaf node stores the network route in a forwarding table to allow the border leaf node to quickly switch any network traffic directed to the first endpoint. The border leaf node also stores a synchronization status associated with the active conversation in step 615. In one example, the synchronization status is saved in a special extended cost community of a BGP update. In another example, the network route and the synchronization status may originate from the border leaf node performing steps 610 and 615. Alternatively, the network route and synchronization status may originate from a separate network element. In step 620, the border leaf node determines whether it is receiving network traffic in the active conversation. If the border leaf node is receiving network traffic in the active conversation, then it continues to forward the traffic and monitors for an end to the network traffic in the active conversation.

Once the border leaf node detects that the network traffic in the active conversation has stopped, the process 600 determines in step 630 if the border leaf node is the original border leaf node that initially received the network traffic, determined the network route, and set the synchronization status. Referring to the examples described in FIGS. 3 and 4, step 630 determines if the border leaf node is the first border leaf 152.

If the process 600 is running on the first border leaf node 152, then the border leaf node 152 begins an age out timer in step 642. While the age out timer runs, the border leaf node 152 monitors for additional traffic in the conversation in step 642. If the border leaf node 152 detects additional traffic in the active conversation, then the border leaf node 152 cancels the age out timer in step 644 and returns to monitoring for conversation traffic in step 620. If the border leaf node 152 does not detect any additional traffic for the now-inactive conversation before the timer runs out in step 646, then the border leaf node 152 removes the synchronization status for the network route in step 650. Removing the synchronization status signals all of the other border leaf nodes in the computer network to remove the synchronization status for that network route stored in their respective forwarding tables.

Again referring to the example of FIGS. 3 and 4, step 630 determines if the border leaf node is not the original border leaf node 152 (e.g., it is the second border leaf node 154 or the third border leaf node 156). If the process is running on, for example, the border leaf node 154, then the border leaf node 154 determines whether the network route associated with the conversation has an active synchronization status in step 660. When a network route is stored with an active synchronization status, then the border leaf node 154 does not attempt to age out the network route and returns to monitoring for traffic in the conversation. If the network route is not associated with an active synchronization status, then the border leaf node 154 begins an age out timer in step 680. While the age out timer runs, the border leaf node 154 monitors for additional traffic in the conversation in step 682. If the border leaf node 154 receives additional traffic in the active conversation, then the border leaf node 154 updates the synchronization status of the network route in all of the border leaf nodes (e.g., border leaf nodes 152 and 156) in step 684. Updating the synchronization status in step 684 also signals the other border leaf nodes to cancel any age out timers that may be running for the network route in the active conversation.

In other words, the border leaf node 154, which was not the border leaf node 152 to initiate the association between the network path and the active conversation, has taken over responsibility for the active conversation, and becomes the "original" border leaf node for the active conversation. If the border leaf node 154 does not detect any additional traffic for the now-inactive conversation before the timer runs out in step 686, then the border leaf node 154 removes the network route from the forwarding table in step 690. In one example, the border leaf node 154 may signal the other border leaf nodes 152 and 156 to remove the network route as well. Alternatively, each border leaf node may run its own age out timer on the network route, and purge the forwarding table entry in response to its respective age out timer.

In summary, the techniques described herein provide a mechanism for synchronizing active Internet Protocol (IP) conversations across multiple border leaf nodes within a cluster to efficiently forward North-South traffic so that failure of an individual border leaf incurs no additional penalty when layer 3 conversational learning is employed. The same techniques may be employed with IPv4 and IPv6 endpoints. In high performance data centers, scale and convergence are both important to the success of applications. Often these contradictory goals must be balanced against each other. With the techniques presented herein, scale can be improved without sacrificing convergence or increasing complexity significantly. The use of FIB tables on border leaf nodes and IP forwarding are both effectively improved between external endpoints and tenant endpoints in a data center. While the examples described herein have been largely directed toward failure scenarios (e.g., border leaf failure), any network event (e.g., network topology changes) that causes network traffic in active conversations to shift from one border leaf to another border leaf will also benefit from the techniques presented herein.

In one form, a computer implemented method provides for synchronizing network routes among network gateway elements. A first network gateway element of a first computer network receives network traffic directed to a first endpoint device from a second endpoint device. The first endpoint device is connected to the first computer network, and the second endpoint device is external to the first computer network. In response to a determination that the first network gateway element does not have a stored network route on the first computer network for the network traffic in an active conversation between the first endpoint device and the second endpoint device, the first network gateway element determines a valid network route on the first computer network for the network traffic in the active conversation between the first endpoint device and the second endpoint device so that the network traffic reaches the first endpoint device. The first network gateway element stores the valid network route and forwards the network traffic to the first endpoint device according to the valid network route. The first network gateway element transmits a synchronization message to one or more second network gateway elements of the first computer network. The synchronization message causes the second network gateway element(s) to store the valid network route and an indication that the first network gateway element is forwarding the network traffic in the active conversation between the first endpoint device and the second endpoint device.

In another form, an apparatus comprising a network interface unit, a memory, and a processor is provided for synchronizing network routes among network gateway elements. The network interface unit enables network communications between the apparatus and other computing devices. The processor is coupled to the memory and the network interface unit, and is configured to receive network traffic via the network interface unit. The network traffic is directed to a first endpoint device connected to a first computer network from a second endpoint external to the first computer network. In response to a determination that the memory does not have a stored network route on the first computer network for the network traffic in an active conversation between the first endpoint device and the second endpoint device, the processor is further configured to determine a valid network route on the first computer network for the network traffic in the active conversation between the first endpoint device and the second endpoint device so that the network traffic reaches the first endpoint device. The processor is also configured to store the valid network route in the memory and forward the network traffic via the network interface unit to the first endpoint device according to the valid network route. The processor is further configured to cause the network interface unit to transmit a synchronization message to one or more network gateway elements of the first computer network. The synchronization message causes the network gateway elements to store the valid network route and an indication that the apparatus is forwarding the network traffic in the active conversation between the first endpoint device and the second endpoint device.

In still another form, a system comprising a first network gateway element of a first computer network and one or more second network gateway elements of the first computer network are provided for synchronizing network routes among the network gateway elements of the first computer network. The first network gateway is configured to receive network traffic directed to a first endpoint device connected to the first computer network from a second endpoint device external to the first computer network. In response to a determination that the first network gateway element does not have a stored network route on the first computer network for the network traffic in an active conversation between the first endpoint device and the second endpoint device, the first network gateway element determines a valid network route on the first computer network for the network traffic in the active conversation between the first endpoint device and the second endpoint device so that the network traffic reaches the first endpoint device. The first network gateway element stores the valid network route and forwards the network traffic to the first endpoint device according to the valid network route. The first network gateway element is also configured to transmit a synchronization message to the second network gateway element(s) of the first computer network. The second network gateway element(s) are each configured to receive the synchronization message, store the valid network route, and store an indication that the first network gateway element is forwarding the network traffic in the active conversation between the first endpoint device and the second endpoint device.

In yet another form, one or more non-transitory computer readable storage media is provided that is encoded with instructions that, when executed by a processor, cause the processor to perform any of the methods described and shown herein.

It is to be appreciated that the above examples are not mutually exclusive and may be combined in various arrangements. It is also to be appreciated that the above description is intended by way of example only. Various modifications and structural changes may be made therein without departing from the scope of the concepts described herein and within the scope and range of equivalents of the claims. In particular, any specific implementation details described using a BGP protocol may be implemented using any protocol that carries information between network elements.

What is claimed is:

1. A method comprising:
at a first network gateway element of a first computer network, receiving, from a second endpoint device external to the first computer network, network traffic directed to a first endpoint device connected to the first computer network;
in response to a determination that the first network gateway element does not have a stored network route on the first computer network for the network traffic in an active conversation between the first endpoint device and the second endpoint device, determining a valid network route on the first computer network for the network traffic in the active conversation between the first endpoint device and the second endpoint device so that the network traffic reaches the first endpoint device;
storing the valid network route on the first network gateway element;
forwarding the network traffic to the first endpoint device according to the valid network route; and
transmitting a synchronization message to one or more second network gateway elements of the first computer network, wherein the synchronization message causes the second network gateway elements to store the valid network route and refrain from aging out the valid network route associated with the active conversation.

2. The method of claim 1, wherein storing the valid network route comprises adding or updating an entry associated with the first endpoint device in a forwarding information base.

3. The method of claim 1, wherein determining the valid network route comprises querying a routing information base.

4. The method of claim 1, further comprising:
detecting an end to the network traffic in the active conversation at the first network gateway element;
aging out the valid network route on the first network gateway element; and
after aging out the valid network route of the first network gateway element, transmitting an update message to the one or more second network gateway elements, wherein the update message causes the one or more second network gateway elements to age out the valid network route stored on the one or more second network gateway elements.

5. The method of claim 4, further comprising:
receiving a renewal message from a particular network gateway element among the one or more second network gateway elements, wherein the renewal message indicates that the particular network gateway element has received additional network traffic from the active conversation;
storing the valid network route and a notation that the particular network gateway element is forwarding the network traffic in the active conversation between the first endpoint device and the second endpoint device, wherein the notation prevents the first network gateway element from aging out the valid network route.

6. The method of claim 1, further comprising:
responsive to detecting a pause in the network traffic of the active conversation, beginning an age out timer for the valid network route;
receiving additional network traffic from the active conversation; and
halting the age out timer.

7. An apparatus comprising:
a network interface unit that enables network communications;
a memory; and
a processor, coupled to the network interface unit and the memory, and configured to:
receive network traffic, via the network interface unit, directed to a first endpoint device connected to a first computer network from a second endpoint device external to the first computer network;
in response to a determination that the memory does not have a stored network route on the first computer network for the network traffic in an active conversation between the first endpoint device and the second endpoint device, determine a valid network route on the first computer network for the network traffic in the active conversation between the first endpoint device and the second endpoint device so that the network traffic reaches the first endpoint device;

store the valid network route in the memory;

forward the network traffic via the network interface unit to the first endpoint device according to the valid network route; and cause the network interface unit to transmit a synchronization message to one or more network gateway elements of the first computer network, the synchronization message causing the network gateway elements to store the valid network route and refrain from aging out the valid network route associated with the active conversation.

8. The apparatus of claim 7, wherein the processor is configured to store the valid network route by adding or updating an entry associated with the first endpoint device in a forwarding information base saved on the memory.

9. The apparatus of claim 7, wherein the processor is configured to determine the valid network route by querying a routing information base.

10. The apparatus of claim 7, wherein the processor is further configured to:

detect an end to the network traffic in the active conversation at the apparatus;

age out the valid network route on the memory of the apparatus; and after aging out the valid network route of the apparatus, cause the network interface unit to transmit an update message to the one or more network gateway elements, the update message causing the one or more network gateway elements to age out the valid network route stored on the one or more network gateway elements.

11. The apparatus of claim 10, wherein the processor is further configured to:

receive a renewal message, via the network interface unit, from a particular network gateway element among the one or more network gateway elements, the renewal message indicating that the particular network gateway element has received additional network traffic from the active conversation;

store in the memory the valid network route and a notation that the particular network gateway element is forwarding the network traffic in the active conversation between the first endpoint device and the second endpoint device, the notation preventing the apparatus from aging out the valid network route.

12. The apparatus of claim 7, wherein the processor is further configured to:

detect a pause in the network traffic of the active conversation;

begin an age out timer for the valid network route;

receive via the network interface, additional network traffic from the active conversation; and halt the age out timer.

13. A system comprising:

a first network gateway element of a first computer network, the first network gateway element configured to:

receive network traffic directed to a first endpoint device connected to the first computer network from a second endpoint device external to the first computer network;

in response to a determination that the first network gateway element does not have a stored network route on the first computer network for the network traffic in an active conversation between the first endpoint device and the second endpoint device, determine a valid network route on the first computer network for the network traffic in the active conversation between the first endpoint device and the second endpoint device so that the network traffic reaches the first endpoint device;

store the valid network route on the first network gateway element;

forward the network traffic to the first endpoint device according to the valid network route; and transmit a synchronization message to one or more second network gateway elements of the first computer network; and the one or more second network gateway elements of the first computer network, each second network gateway element configured to:

receive the synchronization message;

store the valid network route;

store an indication that the first network gateway element is forwarding the network traffic in the active conversation between the first endpoint device and the second endpoint device; and refrain from aging out the valid network route associated with the active conversation based on the synchronization message.

14. The system of claim 13, wherein storing the valid network route comprises adding or updating an entry associated with the first endpoint device in a forwarding information base.

15. The system of claim 13, wherein the first network gateway element is configured to determine the valid network route by querying a routing information base.

16. The system of claim 13, wherein the first network gateway element is further configured to:

detect an end to the network traffic in the active conversation at the first network gateway element;

age out the valid network route on the first network gateway element; and after aging out the valid network route of the first network gateway element, transmit an update message to the one or more second network gateway elements; and wherein each respective second network gateway element of the one or more second network gateway elements is further configured to begin an age out process for the valid network route stored on the respective second network gateway element in response to receiving the update message.

17. The system of claim 16, wherein a particular network gateway element among the one or more second network gateway elements is further configured to:

receive additional network traffic from second endpoint device in the active conversation;

forward the additional network traffic to the first endpoint device based on the valid network route; and transmit a renewal message to the first network gateway element and the one or more second network gateway elements, the renewal message indicating that the particular network gateway element has received the additional network traffic from the active conversation.

18. The system of claim 17, wherein the first network gateway element is further configured to:

receive the renewal message;

store the valid network route and a notation that the particular network gateway element is forwarding the additional network traffic in the active conversation between the first endpoint device and the second endpoint device; and based on receiving the renewal message, prevent the valid network route from being aged out.

19. The system of claim 17, wherein each of the one or more second network gateway elements other than the particular network gateway element is further configured to:
- receive the renewal message;
- store the valid network route and a notation that the particular network gateway element is forwarding the additional network traffic in the active conversation between the first endpoint device and the second endpoint device; and
- based on receiving the renewal message, stop the age out process for the valid network route that was begun in response to receiving the update message.

20. The system of claim 13, wherein the first network gateway element is further configured to:
- detect a pause in the network traffic of the active conversation;
- begin an age out timer for the valid network route;
- receive via the network interface, additional network traffic from the active conversation; and
- halt the age out timer.

\* \* \* \* \*